Oct. 22, 1957 F. A. HESTER 2,810,782

FREQUENCY MODULATED COMMUNICATIONS SYSTEM
WITH MULTIPLEXED AUDIO CHANNELS

Filed Dec. 21, 1953 5 Sheets-Sheet 1

FIG. I

INVENTOR
FRANK A. HESTER
BY J. B. Burke
ATTORNEY

INVENTOR
FRANK A. HESTER
BY J. B. Burke
ATTORNEY

Oct. 22, 1957 F. A. HESTER 2,810,782

FREQUENCY MODULATED COMMUNICATIONS SYSTEM WITH MULTIPLEXED AUDIO CHANNELS

Filed Dec. 21, 1953

5 Sheets-Sheet 3

INVENTOR.
FRANK A. HESTER
BY J. B. Burke
ATTORNEY

INVENTOR.
FRANK A. HESTER
BY J. B. Burke
ATTORNEY

Oct. 22, 1957 F. A. HESTER 2,810,782

FREQUENCY MODULATED COMMUNICATIONS SYSTEM WITH MULTIPLEXED AUDIO CHANNELS

Filed Dec. 21, 1953 5 Sheets-Sheet 5

INVENTOR
FRANK A. HESTER

BY J. B. Burke

ATTORNEY 2,810,782

FREQUENCY MODULATED COMMUNICATIONS SYSTEM WITH MULTIPLEXED AUDIO CHANNELS

Frank A. Hester, New York, N. Y., assignor to Hogan Laboratories, Inc., New York, N. Y., a corporation of New York Application December 21, 1953, Serial No. 399,353

10 Claims. (Cl. 178—5.6)

The present invention relates to a new system of radio multiplexing, and more particularly to a signaling system wherein a plurality of signals are simultaneously transmitted via a single frequency modulated radio frequency carrier.

This application is a continuation-in-part of application Serial No. 84,622, filed March 31, 1949, now abandoned.

It is a principal object of the present invention to provide apparatus for simultaneously transmitting a plurality of audio frequency signals on a single frequency modulated radio frequency carrier without occurrence of interference or cross modulation between the signals.

It is a further object to provide a system for frequency modulation transmission wherein within the standard and conventional 200 megacycle frequency band allotted to a frequency modulated transmitter station one, two or more auxiliary channels may be accommodated in addition to the primary audio frequency channel without lowering the quality of the primary audio signal below the high standard of excellence currently required of such stations.

It is a further object of the invention to provide a multiplex system for transmitting in one channel a signal of superaudible frequency amplitude modulated by a subcarrier which subcarrier is amplitude modulated by an audio frequency signal, and for transmitting in another channel another audio frequency signal, with cross-modulation between channels effectively prevented; and for simultaneously frequency modulating a radio frequency carrier by the output of both channels.

It is a further object to provide a system of multiplexing plural signal channels in a radio frequency modulator of conventional type designed to transmit a single audio channel without requiring modification or alteration of the modulator to accommodate the additional channels.

It is a further object to provide a novel multiplex system for a primary audio signal channel and plural auxiliary signal channels in which a conventional frequency modulation receiver receives the primary audio signal without interference from the auxiliary signals and auxiliary receivers receive the auxiliary signals without interference from the primary audio signal and without interference between the auxiliary signals.

It is a further object to provide a system for multiplexing facsimile and audio signals in such a manner that neither the facsimile signals nor the audio signals are inferior in quality or power compared with similar signals transmitted separately.

It is a further object to provide an audio-facsimile multiplex system which incorporates standard broadcast frequency-modulation transmitting and receiving equipment and standard facsimile equipment.

Others have attempted to achieve some of the objects above stated with varying degrees of success. Among the prior systems proposed may be mentioned those of E. H. Armstrong as described in Patent 2,104,012 and H. Roder as described in Patent 2,233,183. A basic difficulty encountered by all prior art systems was that cross modulation between the several channels was not effectively prevented. A further disadvantage encountered was that conventional frequency modulation receivers designed to receive only the primary audio frequencies required certain material modifications to avoid receiving the auxiliary signals.

No claim is made by the present inventor to the broad idea or the fundamental principles involved in simultaneous transmission of primary audio and auxiliary signals. However, as the result of exhaustive analyses and extensive experiments, certain new features relating to such system have been invented which, for the first time, make possible the full attainment of commercially-successful frequency modulation multiplexing.

In multiplexing primary audio and auxiliary signals according to the invention, the auxiliary signals are carried by one or more superaudible carriers and are combined with a primary audio signal originating as sound signals in the frequency range of from 30 to 15,000 cycles per second. The combined signal is used to frequency modulate a radio frequency carrier. The systems of the prior art above mentioned employ non-linear circuits such as individual amplifiers at the outputs of the several channels which supply the primary audio and superaudible signals via a common path to the modulator of the transmitter. At the outputs of the several auxiliary channels are produced undesired audio frequency subharmonics of the superaudible frequency carrier due to inherent non-linearity of the amplifiers and undesired audio frequency signals as a result of partial demodulation of the superaudible frequency carriers, and at the primary audio channel output are produced undesired superaudible frequency signals which are harmonics of the primary audio signals in the primary channel. All these undesired signal frequencies which are solely the result of non-linearity of the several circuit outputs are combined in the common path to the transmitter modulator with each other and with the desired audio and superaudible frequency signals. The resulting interference between the several signals renders satisfactory multiplexing impossible. The present invention avoids this troublesome interference by providing suitable filters at the outputs of the several channels. Certain systems of the prior art above mentioned also employ an amplifier in the common path to the frequency modulator of the radio frequency transmitter. Cross modulation occurs between the primary and auxiliary signals in this common path due to inherent non-linearity of the amplifier which further increases interference between the several signals. The present invention avoids this source of interference by providing a common linear transmission path from the outputs of all channels directly to the modulator of the transmitter.

A particularly important feature of the present invention is that the audio frequency signals carried by the frequency modulated radio frequency carrier may be received by a standard type of frequency modulation receiver without interference from the superaudible frequency signals also used to modulate the carrier. In order to insure that there is no perceptible interference between the primary audio frequency signals and any auxiliary signals in the receiver for the primary signals, the amplitudes of the several signals modulating the radio frequency carrier at the transmitter are fixed at predetermined relative levels which effectively minimize such interference.

At the present time, standard audio programs are being broadcast to the public by means of frequency-modulated radio waves in the neighborhood of 85 to 110 megacycles. One of the advantages of transmission by frequency modulation is that a high signal-to-noise ratio can be maintained even in the presence of electrical disturbances of considerable magnitude. In order to attain this high signal-to-noise ratio, radio broadcasting stations have been required to provide a degree of modulation such that the transmitted frequencies deviate 75 kilocycles on each side of the center carrier frequency at 100 percent modulation.

At the present time there are a great many receivers in the hands of the public which are capable of receiving such standard FM audio frequency programs. The present interest of those engaged in broadcasting high-fidelity FM programs must not be prejudiced by permitting the multiplexed transmission of auxiliary signals to interfere therewith. Also a commercially acceptable multiplexing system must be operable without reduction of quality or interference with the reception of FM audio programs in the many receivers now in use and adapted solely for the reception of standard FM audio programs. The present invention accomplishes multiplexing of auxiliary signal programs with the primary audio programs without noticeable interference occurring between the several programs.

The primary audio signals above mentioned refer to radio frequency signals in the range of 30 to 15,000 cycles per second and generally originate as sound signals. The auxiliary signals above mentioned also refer to audio frequency signals in the range of 0–10,000 cycles per second, and may originate as sound signals in a radio or telephone system, as facsimile signals derived from graphic copy by a facsimile scanner, as a coded message as in telegraph and teletype systems, as pulses obtained in telemetering and other instrumentation systems, etc.

A preferred embodiment of the invention will be explained with reference to a system in which facsimile signals are multiplexed with the primary audio signals. This is intended to be illustrative of only one manner in which the invention may be used since it will be apparent that other types of signals may be multiplexed with the primary audio signals in addition to or instead of facsimile signals. Other embodiments of the invention will also be described.

The term facsimile is intended to designate the art of transmission of graphic material through the medium of electrical signals. Graphic material in the form of pictures and/or test is optically scanned point-by-point and line-by-line, the variations in light reflected from the copy being translated into electrical variations by means of a photoelectric cell. These electrical variations may consist of frequencies in the range of from 0–3,000 cycles per second and may be used to amplitude modulate a subcarrier having a frequency of 10,000 cycles per second in one channel of a multiplex system embodying the invention. The resulting double sideband modulated subcarrier will then cover a frequency band of from 7,000 to 13,000 cycles per second and is suitable for transmission over telephone wire lines. This modulated subcarrier may then be heterodyned with a superaudible frequency subcarrier, filtered, amplified and filtered again, then combined with the filtered audio frequency output of the primary audio channel in a linear transmission network. The combined signals are delivered directly to a frequency modulator where a radio frequency carrier is modulated. The modulated carrier is transmitted or radiated to a distant point where the modulated carrier is received by a conventional frequency modulation receiver. In the receiver the primary audio signal is derived from the demodulated carrier in the usual way. The auxiliary signals, whether facsimile or otherwise are diverted into a separate channel. If there are more than one set of auxiliary signals, they are separated into their respective channels by filters according to the frequency bands occupied by their modulated superaudible carriers. After demodulation of the superaudible carriers, the original auxiliary signals are obtained. The auxiliary facsimile signals are delivered to a facsimile recorder where the original copy is recreated point-by-point and line-by-line. Suitable reproducers are employed for other types of auxiliary signals.

In the first embodiment of the invention to be described, the transmitted radio-frequency carrier is frequency-modulated by primary audio frequency signals, which originate as a sound program occupying a frequency range of 30 to 15,000 cycles per second, and the carrier is simultaneously frequency modulated by facsimile program signals carried by a modulated superaudible frequency subcarrier occupying a band about 6,000 cycles per second wide. The maximum amplitude of the amplitude modulated superaudible frequency subcarrier is fixed at a predetermined relative value with respect to the maximum amplitude of the primary audio frequency signals so that the radio frequency carrier is modulated in the same ratio; that is, the deviation of the radio frequency carrier by the superaudible frequency subcarrier is so fixed with relation to the deviation caused by the primary audio frequency signals and with relation to the total deviation of the radio frequency carrier, that no interference between the signals is perceptible at the loudspeaker of a standard frequency modulation receiver. Stated quantitatively the ratio of the deviations of the radio frequency carrier produced by the several modulating signals produces an interfering signal in a standard frequency modulation receiver which has an amplitude at least 60 decibels less than the amplitude of the desired audio frequency signals.

The receiving system of the present invention includes an adapter connectible to a standard frequency modulation receiver for the selection, amplification and recording of the facsimile program signals. The facsimile signal reproducing means is operated without modification of the circuit or disturbance with the normal functioning of the receiver for reproducing the original sound programs. Likewise the facsimile signal receiving and reproducing means is operated without interference by the primary audio frequency signals.

In a modification of the invention employing a primary audio frequency signal channel and plural auxiliary audio frequency signal channels, the several channels are provided with suitable filters at their outputs and with a common linear transmission path to the frequency modulator of the transmitter. Each auxiliary channel transmits a subcarrier of a unique superaudible frequency which is amplitude modulated by audio frequency signals in that channel. The maximum deviation of the radio frequency carrier caused by all the modulated subcarriers is fixed at such a predetermined value that the interference ratio between the primary and auxiliary signals in the output of a standard frequency modulation receiver is at least 60 decibels.

For a better understanding of the invention, reference is had to the following description taken in conjunction with the appended drawings wherein.

Figure 1:
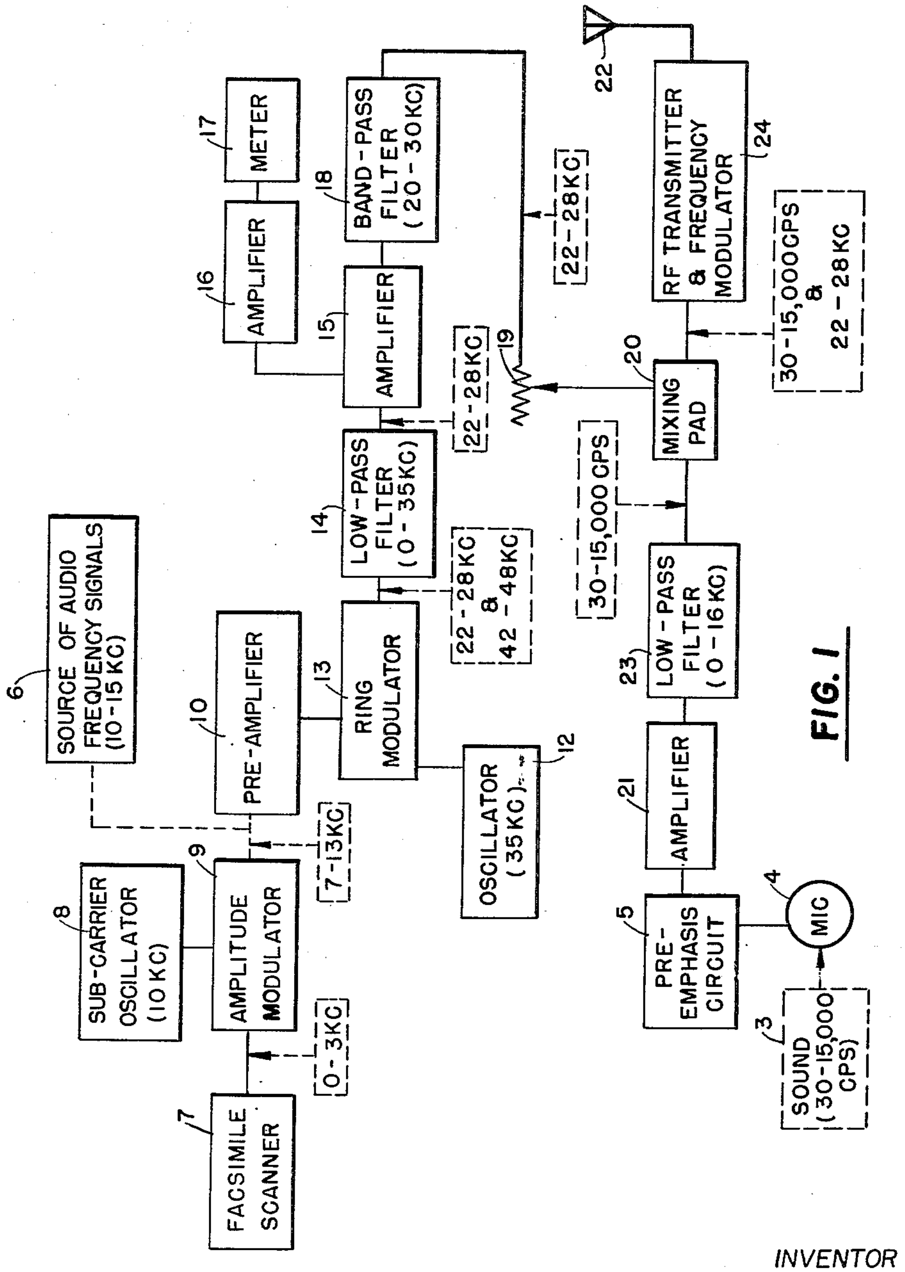
Fig. 1 is a block diagram of a portion of a multiplex transmission system arranged in accordance with the teaching of this invention.

Referring now in greater detail to the drawings, Fig. 1 shows a system including a facsimile scanner 7 which may include a pickup scanner, photoelectric cell and amplifiers. The scanner derives electrical signals from scanned graphic copy having a frequency range of zero to 3,000 cycles per second. These facsimile signals are delivered to an amplitude modulator 9. An oscillator 8 delivers a ten kilocycle subcarrier signal to the modulator 9. The facsimile signals amplitude modulate the subcarrier in the modulator to produce a double sideband wave output occupying the audio frequency band of 7 to 13 kilocycles. The modulator output is delivered to preamplifier 10. The circuit thus far described corresponds with that disclosed in my prior Patent 2,545,463. The output of preamplifier 10 and the output of a 35 kc. oscillator 12 are applied to a balanced or ring modulator 13. The 35 kc. output of oscillator 12 is amplitude modulated in modulator 13 by the 7 to 13 kc. output of amplifier 10. The output of the modulator lies between the limits of 22 and 48 kc. and consists of one group of frequencies in the range of 22 to 28 kc. and a mirror image group in the range of 42 to 48 kc. The 35 kc. carrier is suppressed in the modulator. Low pass filter 14 arranged to pass signals up to 35 kc. eliminates the 42 to 48 kc. group and passes the 22 to 28 kc. group to amplifier 15. A portion of the signals appearing in amplifier 15 may be passed through amplifier 16 to a metering circuit 17. The signal frequencies in the range of from 22 to 28 kc. are applied from amplifier 15 to band-pass filter 18 which passes only the signal frequencies in the band of from 22 to 28 kc. This signal is then applied through a linear variable attenuator 19 to mixing pad 20. Mixing pad 20 is a linear network which with attenuator 19 constitutes a direct linear transmission path to the frequency modulator and radio frequency transmitter 24.

The sound program signal which may be in the frequency range of 30 to 15,000 cycles per second is applied from a sound source 3 via microphone 4 and a pre-emphasis circuit 5 to an audio amplifier 21. After amplification, the audio signals are applied to low pass filter 23 which passes only those frequency components below about 16 kc. to mixing pad 20. The combined amplitude modulated superaudible carrier signal and the audio signals are applied via mixing pad 20 directly to the modulator and frequency modulation radio transmitter 24 in a common linear transmission path. A radio frequency carrier frequency modulated by the audio signals and the amplitude modulated superaudible carrier is radiated from antenna 22 to a receiving system to be described.

It will be noted from Fig. 1 that there is no non-linear common path for the superaudible frequency facsimile signal and the primary audio signal, as for example through a common amplifier. Since all commercially practical amplifiers are subject to some cross modulation due to inherent non-linearity, the arrangement shown is vastly superior to the devices of the prior art in preventing interference between the facsimile signals and the primary audio signals which are both audio frequency signals. The mixing pad 20, being a purely linear network does not introduce non-linear distortion so that cross modulation in the common linear transmission path to the frequency modulator between the facsimile and other audio signals does not occur. Attention is also invited to the reason for the introduction of the low pass filter 23 between the audio amplifier 21 and the mixing pad 20. The second harmonics of 11 to 14 kc. audio signals fall in the superaudible frequency signal range of 22 to 28 kc. and these harmonics are prevented from reaching the transmitter modulator 24 because of the presence of filter 23. Interference in the facsimile recording due to these harmonics is thereby precluded.

The maximum amplitudes of the input signals to the mixing pad 20 from the respective channels, that is, the maximum amplitudes of the outputs of the primary audio channel and the auxiliary channel will be fixed at a predetermined ratio in accordance with certain considerations to be explained below. A satisfactory ratio for the two channel arrangement of Fig. 1 will be about 14 to 1, so that the primary audio signals cause a maximum deviation of the radio frequency carrier of about 70 kc., while the auxiliary signal causes a deviation of about 5 kc. making the total deviation 75 kc. Some of the reasons for selecting this ratio of amplitudes are as follows:

In the operation of the system of this invention, with audio frequency program signals occupying the range of 30–15,000 cycles per second transmitted in the primary channel, and facsimile program signals occupying a range of 0–3,000 cycles carried by a superaudible frequency subcarrier in an auxiliary channel, the radio frequency carrier is frequency modulated by the primary audio program to a degree such that 100 percent modulation causes a frequency deviation of about 70 kc. on each side of the center frequency. The radio frequency carrier is further frequency modulated by the superaudible frequency facsimile program to a degree such that 100 percent modulation causes a frequency deviation of about 5 kc. on each side of the center frequency. In other words, the full standard 75 kc. deviation is used for both the primary audio program and multiplexed auxiliary facsimile program with about 5 kc. of deviation used for the facsimile program. It will be remembered, according to the principles of frequency modulation that the rate of change of frequency of the carrier wave carries the intelligence and the extent or deviation of the frequency change determines the degree of amplitude of modulation. It has been found that facsimile signal transmission at modern speeds of 360 lines per minute and 28.1 square inches per minute can be duplexed with audio signal transmission employing about 70 kc. deviation without any mutual interference and without requiring a special receiver to exclude audible components of the facsimile signal from the speaker of the audio signal receiver provided that the deviation produced by the carrier of the facsimile signals is limited to about 5 kc. At 100 percent modulation, a facsimile deviation of 5 kc., or a total swing of 10 kc., has been found to provide very satisfactory reception of the sound and facsimile programs. The reason why this is so will be explained later in connection with Fig. 6.

Extensive experimentation has demonstrated that good facsimile recording may be made with a maximum deviation of the radio frequency carrier produced by the facsimile program, of only 400 cycles. However, with such an extremely small deviation, unusual care is necessary to prevent interference with the facsimile signals by the primary audio signals so that a maximum deviation of at least a few kilocycles is to be preferred. If the maximum facsimile deviation is increased much beyond 10 kc., interference from components of the facsimile signal is sometimes audible in the loudspeaker reproducing the primary audio program. This is one of the difficulties experienced in systems such as shown by Roder and Armstrong above mentioned.

If the transmitter is adjusted so that at 100 percent modulation of the radio frequency carrier by the audio frequency signals in the primary channel, the carrier deviation is about 75 kc., and at 100 percent modulation of the radio frequency carrier by the signals in the auxiliary channel, about 5 kc. deviation of the radio frequency carrier is caused, it is theoretically possible to have a total deviation of 80 kc. In practice however, such total deviation rarely occurs because full modulation of both primary and auxiliary signals very infrequently occurs at the same instant. Even the theoretical possibility of such a minor trespass into the standard two 25 kc. guard bands (established by channel separation of 200 kc. and permissible deviation of 75 kc.) may be avoided by adjusting the primary signals to provide a maximum deviation of 70 kc. This entails a loss of maximum reproducible sound volume of less than one decibel, which is negligible and which can be completely offset in practice by a trifling increase in transmitter power.

The above description essentially describes the multiplexing apparatus required at the transmitter to produce the multiplexed signals according to the present invention. The microphone 4, scanner 7, oscillator 8, and modulator 9 represented in block form in Fig. 1, may be of conventional types well known in the art. The frequency modulated radio frequency transmitter 24 may be of conventional type such as shown on page 205 of "Frequency Modulation" by A. Hund, published in 1942 by McGraw-Hill Book Company, New York. In this type of transmitter the modulating signals from the multiplexer may be fed directly to the input transformer of the reactance modulator of the transmitter. Instead of supplying modulated signals from the signal source consisting of facsimile scanner 7, oscillator 8 and modulator 9, a source of unmodulated audio frequency signals 6 may be connected to the preamplifier 10. These audio frequency signals may cover a maximum range of 0–10 kc., if desired and may be facsimile, telephone, telegraph, Teletype, or any other desired type of audio frequency signals.

Figure 3:
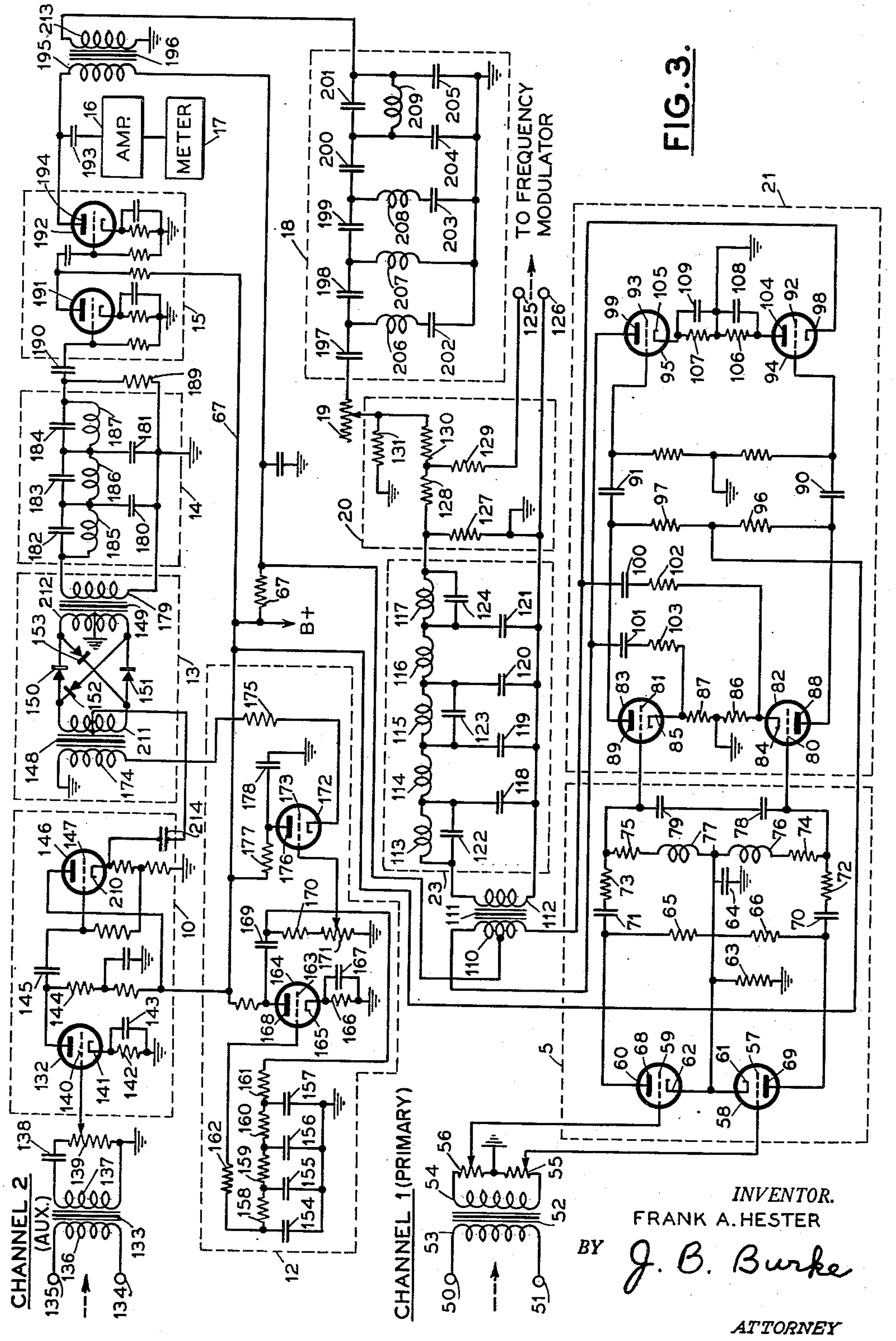
Fig. 3 shows a multiplexing circuit which may be used in the systems of Figs. 1 and 5.

In the circuit of Fig. 3, is shown a two channel multiplexer utilizing circuits in conformance with the block diagram of Fig. 1. Channel 1 is the primary channel provided to transmit audio frequency signals in the range of 30–15,000 cycles per second and channel 2 is the auxiliary channel which transmits audio frequency signals in the range of 0–10,000 C. P. S. originating as facsimile, voice, audio, telephone, telegraph, Teletype, etc. Additional auxiliary channels may be provided substantially identical with channel 2 to multiplex signals from more than two sources as will be subsequently explained.

In channel 1 terminals 50, 51 are the input terminals of a transformer 52 having a primary winding 53 and secondary winding 54, a pair of variable resistors 55, 56 balanced to ground are connected to the terminals of the secondary winding whose midpoint is also grounded. Resistors 55, 56 are connected to a preemphasis circuit 5. Resistor 55 is connected directly to grid 57 of amplifier tube 58. Resistor 56 is connected to grid 59 of amplifier tube 60. Cathodes 61, 62 of tubes 58, 60 are connected together and grounded via resistor 63. Capacitor 64 by-passes high frequency currents from the cathodes 61, 62 to ground. The tubes 58 and 60 are arranged as push-pull amplifiers to effect cancellation of even harmonics in the output circuits of the tubes. The output circuits of the tubes 58 and 60 are identical and consist of load resistors 65, 66 connected via dropping resistor 67 to a source of positive voltage indicated as B+. Resistors 65, 66 are connected to plates 68, 69 of the amplifier tubes. The audio frequency outputs of the tubes 58, 60 are passed through coupling capacitors 70, 71 and resistors 72, 73 to a preemphasis network. The preemphasis network consists of a series circuit balanced to ground including resistors 74, 75 and inductances 76, 77 in parallel with capacitors 78, 79. The preemphasis network is designed to favor or emphasize the higher frequency components of the audio frequency signals transmitted in accordance with accepted communications standards. The balanced output of the preemphasis network is fed to grids 80, 81 of the push-pull amplifier tubes 82, 83. Cathodes 84, 85 are balanced to ground via resistors 86, 87. The outputs of the tubes are fed via plates 88, 89 and coupling capacitors 90, 91 to the grids 92, 93 of the push-pull amplifier tubes 94, 95. The outputs of tubes 82, 83 include the equal loading resistors 96, 97 joined together and connected to the source of positive voltage B+. The outputs of tubes 94, 95 are connected in a negative feedback arrangement with tubes 82, 83. The feedback arrangement includes the plates 98, 99 of tubes 94, 95 connected back to the cathodes 84, 85 of tubes 82, 83 via capacitors 100, 101 and resistors 102, 103. The feedback arrangement reduces harmonic distortion and improves the linearity of amplification of tubes 94, 95. The cathodes 104, 105 of tubes 94, 95 are balanced to ground via resistors 106, 107 which are provided with the usual by-pass capacitors 108, 109. Tubes 82, 83, 94, 95 together constitute the amplifier 21 as shown by the dotted lines. The plates of tubes 94, 95 are connected to the primary winding 110 of a coupling transformer 111. The primary winding 110 is tapped at its midpoint and connected to the source of positive voltage B+ via resistor 67 to provide plates 98, 99 with the necessary positive potential. Secondary winding 112 of transformer 111 is connected to the low pass filter 23 which passes signals only up to about 16,000 cycles per second. The filter consists of a series arrangement of inductances 113, 114, 115, 116 and 117 in parallel with capacitors 118, 119, 120, 121. Capacitors 122, 123, 124 shunt inductances 113, 115, 117 respectively. The common terminal of capacitors 118—121 is grounded. The output of the filter is connected via a linear transmission network to the input terminals 125, 126 of a frequency modulator of a radio frequency transmitter. The linear transmission network consists of the mixing pad 20 which contains five resistors, 127–131 connected directly to terminals 125, 126 of the frequency modulator. If desired, a linear attenuator may be connected between pad 20 and the terminals of the frequency modulator. The mixing pad 20 is thus connected directly to the output of channel 1. The pad 20 is also connected directly to the output of the auxiliary channel 2 which will now be described.

In channel 2, transformer 133 has a primary winding 136 provided with the input terminals 134, 135. Secondary 137 of the transformer has a variable loading resistor 139 and a tuning capacitor 138. The secondary circuit is broadly tuned to pass a double sideband amplitude modulated audio frequency subcarrier. The output of the secondary circuit is taken off the variable resistor 139 connected to grid 140 of the amplifier tube 132 located in preamplifier 10. Cathode 141 is connected to ground via the usual resistor 142 and by-pass capacitor 143. The plate 144 of amplifier tube 10 is connected via coupling capacitor 145 to the grid 147 of cathode follower tube 146. The cathode 210 of tube 146 is connected via capacitor 214 to the input transformer 148 of the ring or balanced modulator 13, at the midpoint of secondary winding 211. The midpoint of primary winding 212 of the output transformer 149 is grounded. As shown in Fig. 3 the ring modulator 13 includes the input transformer 148, output transformer 149 and rectifiers 150—153 in a balanced arrangement.

An oscillator 12 is provided as a source of a subcarrier signal of superaudible frequency. The oscillator includes a resistor-capacitor assembly consisting of four 45 degree sections containing resistors 158—161 and capacitors 154—157. The resistor-capacitor assembly is connected to the control grid 163 of oscillator tube 164 via resistor 162. The cathode 165 of tube 164 is connected to ground via cathode resistor 166 and by-pass capacitor 167. The oscillator output is fed back to the resistor-capacitor assembly from plate 168 via coupling capacitor 169. A fixed resistor 170 and variable resistor 171 are provided in the plate circuit of the oscillator tube. A cathode follower tube 172 receives the superaudible frequency oscillation via grid 173 from the oscillator tube 164 and impresses these oscillations on the primary winding 174 of transformer 148 via resistor 175. The plate circuit of the cathode follower tube includes plate 176 and resistor 177. By-pass capacitor 178 is connected between plate 176 and ground. The secondary winding 179 of transformer 149 is connected to a low pass filter 14 consisting of capacitors 180—184 and inductors 185, 186, 187. The output of the filter is coupled via shunt resistor 189 and series capacitor 190 to the amplifier 15 consisting of the cascaded resistance coupled amplifier tubes 191, 192. An amplifier 16, which may be a cathode follower, may be coupled to the output of amplifier tube 192 via capacitor 193 to operate meter 17. The plate 194 of tube 192 is connected to the primary winding 195 of the coupling transformer 196. The secondary or output winding 213 of the transformer 196 is connected to the bandpass filter 18, consisting of capacitors 197—205 and inductances 206—209. The output of the filter 18 is connected via a linear attenuator 19 to the linear mixing pad 20 which is in turn connected to the terminals 125, 126 of a frequency modulator. The two channel circuit above described is a practical embodiment of that portion of the system shown as a block diagram in Fig. 1, which serves to multiplex the several audio frequency signals according to the invention.

In operation of the multiplexer circuit of Fig. 3, audio frequency signals in the range of 30 to 15,000 cycles per second are applied to terminals 50, 51 of the primary channel 1. The signals are amplified in tubes 58, 60 of the first balanced or push-pull stage and are then applied to the preemphasis network formed by elements 74—79. The preemphasis network imparts high frequency preemphasis to correspond to the standard 75 microsecond curve specified by the Federal Communications Commission. If linear amplification is required omission of inductances 76, 77 and capacitors 78, 79 will convert the preemphasis network to a linear network assembly. The preemphasized signals are then amplified in two succeeding stages of push-pull amplification. The final stage is coupled by transformer 111 which has a linear transmission characteristic to the low pass filter 23. This filter is designed to pass the 30–15,000 cycles per second audio frequency signals and exclude all frequencies, if any, higher than 16,000 C. P. S. The output of the primary channel which is the output of filter 23 is combined in the linear mixer pad 20 with the superaudible frequency signals from the auxiliary channel 2.

In auxiliary channel 2 of the multiplexer circuit, audio frequency signals which preferably occupy a range of 7 to 13 kc. obtained by amplitude modulating a 10 kc. subcarrier with audio frequency signals of 0–3,000 C. P. S., are supplied to the channel input terminals 134, 135. As previously mentioned the 0–3,000 C. P. S. signals may originate as sound signals, or as facsimile, telegraph, Teletype or other signals. The modulated subcarrier signals are applied to a pre-amplifier stage 10 via coupling transformer 133 and attenuator 139. The amplifier tube 132 is resistance coupled to tube 146 operated as a cathode follower to provide a low impedance driving source. The output of the preamplifier 10 is applied between the midpoints of the secondary winding of transformer 148 and the primary winding of transformer 149 at opposite sides of the balanced modulator 13.

Oscillator 12 includes the oscillator tube 164 which in association with the 180 degree phase reversing network including elements 154—161 generates a 35 kc. carrier. This carrier is applied via the cathode follower tube to primary winding of the transformer 148. The output of the modulator 13 is an amplitude modulated double sideband wave with carrier suppressed because of the balanced structure of the ring modulator. The modulator output which is applied to the low pass wave filter 14 consists of two bands which are the heterodyne sum and difference frequencies of the 35 kc. carrier with the 7 to 13 kc. modulated subcarrier. The two bands occupy 22–28 kc. and 42 to 48 kc., 25 kc. and 45 kc. being the center frequencies respectively of the two bands. The higher 42 to 48 kc. band is removed by the filter 14. The remaining 22–28 kc. band which passes the filter is amplified in amplifier 15. Amplifier 15 consists of two stages of resistance coupled amplifiers. The output of the amplifier tube 192 is passed through the linear coupling transformer 196 to bandpass filter 18. Bandpass filter 18 passes only signals in the range of 20–30 kc. so that any harmonics or other frequency components, if any, other than those in the desired 22–28 kc. signal band are removed. The output of the auxiliary channel 2 now consists of a band of signals of superaudible frequency. These signals are transmitted through attenuator 19 which is fixed so that the maximum amplitude of the signals is a predetermined value with respect to the maximum amplitude of the audio frequency signal output of the primary channel 1. The meter 17 fed via amplifier 16 facilitates making this optimum amplitude setting. The reasons for this critical adjustment of the amplitude will be discussed below in connection with Fig. 6. The output of the auxiliary channel 2 is combined in the linear mixer pad 20 with the output of the primary channel 1 and then delivered directly to the frequency modulator of a radio frequency carrier via terminals 125, 126. It will be noted that the common path for the audio frequency (30–15,000 C. P. S.) signals and the superaudible frequency (22–28 kc.) signals is a direct linear transmission network from the output of filters 18, 23 to the frequency modulator terminals 125, 126. The presence of the filters 18 and 23 insures that no undesired harmonics of the several amplifier outputs are present to be combined in the mixer pad. The presence of the linear transmission network 20 insures that no cross modulation can occur between the audio frequency and superaudible frequency signals between the several channels of the multiplexer circuit and the frequency modulator of the radio frequency carrier. No circuit details are shown of the radio frequency transmitter and frequency modulator 24 of Fig. 1, since this apparatus is entirely conventional as heretofore mentioned and forms no part of this invention. The only requirement of the transmitter essential to the present invention is that the radio frequency modulation be driven by the output of the multiplexer circuit without any non-linear element such as an amplifier between the multiplexer and modulator.

Figure 2:
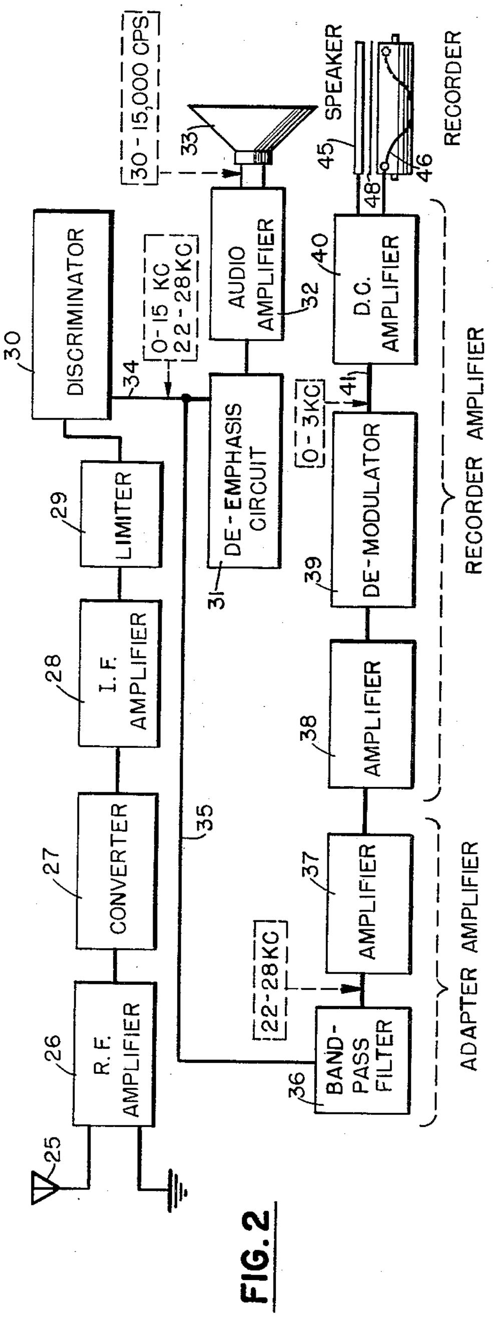
Fig. 2 is a block diagram of a multiplex receiving system for use in association with the transmission system of Fig. 1 and arranged in accordance with the teaching of the invention to include a frequency modulation receiver with an auxiliary signal receiving channel connected thereto.

In Fig. 2, the members 25—33 constitute a conventional frequency modulation receiver such as is shown on page 753 of "Radio Engineering" by F. E. Terman, 3rd edition, published 1947 by McGraw-Hill Book Company, New York. Frequency modulated radio signals are received on antenna 25 and pass with various conventional translations, through R. F. amplifier 26, converter 27, I. F. amplifier 28, limiter 29, discriminator 30, deemphasis circuit 31, and audio amplifier 32 to loudspeaker 33. This frequency modulation receiver is operated in its normal manner regardless of whether the auxiliary receiver channel to be described, is in operation or not. If the auxiliary receiver channel is in operation, the radio frequency amplifier will amplify the modulated carrier received by antenna 25. This carrier has a predetermined center frequency and is deviated at this frequency at audio frequency and superaudible frequency rates. The instantaneous total swing is proportional to the combined instantaneous amplitudes of the original modulating signals. The converter 27 serves to heterodyne the modulated carrier down to a predetermined intermediate frequency range. The output of converter 27 is a signal of intermediate frequency modulated at audio frequency and superaudible frequency rates which is amplified in I. F. amplifier 28 and limited in amplitude to a predetermined value in limiter 29. The input to discriminator 30 is an amplified intermediate frequency signal limited to a predetermined maximum amplitude and deviating at audio frequency and superaudible frequency rates. The maximum deviation of the signal is of the order of 75 kc. The discriminator serves to develop a voltage output proportional in amplitude to the deviation in frequency of the signal input. The output of the discriminator has audio frequency and superaudible frequency components. The superaudible frequency components are attenuated in the deemphasis circuit leaving the audio frequency signals which pass through amplifier 32 and speaker 33 and are reproduced as the original primary audio program. The output of the discriminator 30 is also delivered to the auxiliary receiver channel via conductor 35.

The auxiliary receiver channel consists of members 36 to 45. For purposes of illustration of the invention, but not in limitation thereof the auxiliary channel is shown adapted for receiving and recording facsimile signals. The output of the discriminator 30 includes audio frequency signals due to the audio program having frequency components in the range of 30–15,000 C. P. S., and amplitude modulated signals of superaudible frequency in the range of 22 to 28 kc. carrying the auxiliary signal program. These signals are applied through wire 35 to bandpass filter 36 which is designed to pass the superaudible frequency signals and block the audio frequency signals. The superaudible frequency signals are then amplified in amplifier 37, the filter 36 and amplifier 37 being designated as an "adapter amplifier." Subsequently the signals are applied to a recorder amplifier comprising an amplifier 38, a demodulator 39 and direct current amplifier 40. The output 41 of demodulator 39 consists of fluctuating direct current which, after amplification, is applied to linear electrode 45 and helical electrode 46 of a conventional facsimile recorder. Recording paper 48 passing between the electrodes reproduces point-by-point and line-by-line the graphic copy material originally scanned at the transmitter station.

When the transmitter and receiver stations of Figs. 1 and 2 are operated in accordance with the teaching of this invention, there is no perceptible sound in speaker 33 due to the auxiliary signal portion of the signal received and there is no recording on paper 48 due to the primary audio frequency signal portion of the signal received. It has been suggested that this essential requirement of non-interference between the several signals might be met by inserting a low pass filter in the receiver ahead of deemphasis circuit 31 to exclude all but audio frequency sound signals from speaker 33. However, this expedient would be commercially and practically impossible in view of the rights of the many persons who have frequency modulation audio receivers and are solely interested in receiving frequency modulation audio programs. Furthermore such low pass filters would not prevent any audio frequency demodulation products representing the audio frequency auxiliary signals modulated on the superaudible carrier, from reaching the audio amplifier 32 and speaker 33. These undesired audio-frequency demodulation products are not removed according to the present invention but their amplitude is so low that they fall below the normal thermal noise level in the audio amplifier 32. Their magnitude with respect to the primary audio signals is at least 60 decibels below the primary audio signals so that their presence is imperceptible to an auditor of the sound issuing from speaker 33.

For an explanation of the theory underlying the success of the present invention in eliminating interference in speaker 33 between the desired primary audio frequency signals and the demodulated auxiliary signals, consideration will first be given to the cause of such interference. Signal frequencies in the range of 22–28 kc. are of course not audible and cannot be reproduced by an ordinary radio loudspeaker such as speaker 33. However, the signals which consist of a 22–28 kc. subcarrier amplitude modulated by frequencies in the range of 0–10,000 C. P. S. in passing through discriminator 30 and audio amplifier 32 are partially demodulated by inherent non-linear characteristics thereof and the resulting 0–10,000 C. P. S. fluctuations are in a range of clearly audible sound. The magnitude of the sound in the speaker due to the partially demodulated auxiliary signals must be related to the magnitude of the sound program reproduced in considering whether auxiliary signal interference is audible in the loudspeaker. An interference, such as is present herein, which is at least 60 decibels below the sound signal is universally considered as no interference at all. The manner in which the auxiliary signal interference is limited to 60 decibels below the sound signal will now be described.

The demodulation effect or distortion in discriminator 30 is very small even for relatively large-deviation auxiliary signal modulation, so that demodulation in the discriminator may be ignored. The 22–28 kc. auxiliary signals in going through a conventional deemphasis circuit 31 are attenuated by about 20 decibels. A conventional audio amplifier 32 introduces a demodulation distortion in the order of 5 percent. This degree of distortion in the amplifier means that its output carries an audible auxiliary signal which is 26 decibels below the amplitude of the 22–28 kc. subcarrier signal. If the radio frequency carrier is frequency modulated to a maximum deviation of 70 kc. by the primary audio frequency signals and 5 kc. by superaudible frequency subcarrier of the auxiliary signals, the auxiliary signals are initially at least 20 decibels below the sound signals. Therefore, the audible auxiliary signals in speaker 33 are at least 66 decibels below the sound signal, this figure being arrived at by adding the 20 decibels difference between the primary and auxiliary signal energies in the received radio signal, the 20 decibels attenuation of the superaudible frequency signals in deemphasis circuit 31 and the 26 decibels loss an auxiliary signal strength resulting from 5 percent demodulation in audio amplifier 32. An interfering signal in a loudspeaker which is at least 66 decibels down from the desired sound signal is impossible of detection by the human ear. These conclusions have been born out by actual tests of multiplexing equipment constructed according to the teaching of this invention.

Figure 6:
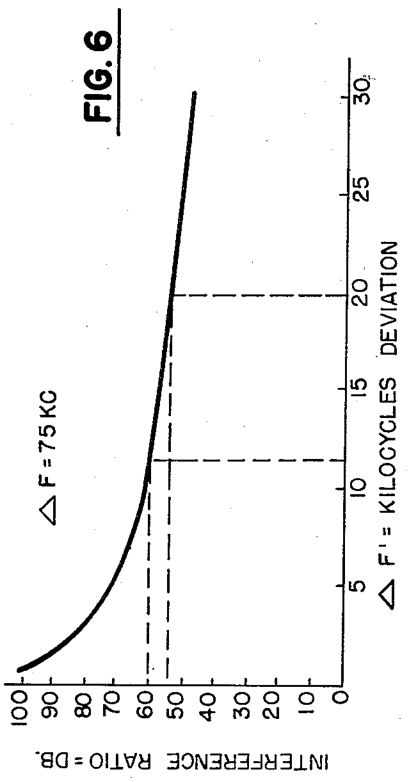
Fig. 6 shows a characteristic curve useful in explaining the invention.

In Fig. 6 is shown graphically the interference ratio in decibels as a measure of the audible interference produced in a conventional frequency modulation receiver as shown in Fig. 2 by an amplitude modulated superaudible frequency subcarrier multiplexed with primary audio frequency signals according to the system of Fig. 1. The curve in Fig. 6 is plotted for a receiver having inherently 5% demodulation distortion which is the distortion figure of an average quality frequency modulation receiver. The total standard R. F. carrier deviation $\Delta F$ is 75 kc. and the deviations $\Delta F'$ of the R. F. carrier produced by the amplitude modulated superaudible frequency subcarriers are taken over the range of about 0.5 kc. to 30 kc. The 60 decibels level is taken as that in which no audible interference will be perceptible in the speaker 33. As shown in Fig. 6, at $\Delta F'$ equal to approximately 10 kc. deviation, the interference ratio is at least minus 60 dbs. For all deviations less than 10 kc. the interference ratio becomes progressively steadily higher. Fig. 6, illustrates that deviations up to about 10 kc. produce optimum interference ratios. However, deviations as great as 20 kc. will still produce tolerable interference ratios.

Figure 4:
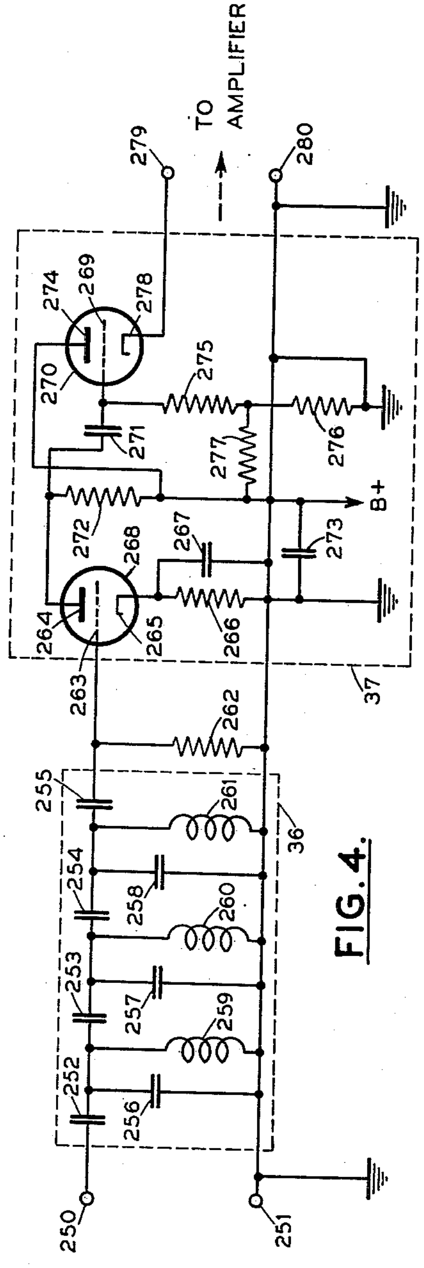
Fig. 4 shows a circuit diagram of an adapter amplifier which may be employed in the receiving system of Figs. 2 and 7.

In Fig. 4 is shown a circuit diagram which may serve as a practical embodiment of the adapter amplifier of Fig. 2. The circuit includes a bandpass filter portion 36 and amplifier section 37. The input terminals 250, 251 of the adapter amplifier are to be connected directly to the output of discriminator 30 of a conventional frequency modulation receiver as shown in Fig. 2. No amplifier may be used between the discriminator and filter 37 or objectionable intermodulation of the signals in the discriminator output will occur. The filter consists of a series arrangement of capacitors 252—255, shunted capacitors 256, 257, 258, and shunted radio frequency choke coils 259, 260, 261. The filter is designed to pass signals in the range of 22–28 kc. and sharply attenuate signals outside of the bandpass region. The output of the filter is coupled via resistor 262 to grid 263 of amplifier 268. Cathode 265 is connected to ground via resistor 266 and bypass capacitor 267. The plate 264 of amplifier 268 is coupled to grid 269 of the cathode follower 270 via coupling capacitor 271. A load resistor 272 is provided between plate 268 and a source of positive potential B+. Bypass capacitor 273 is provided between B+ and ground. Plate 274 of the cathode follower is connected directly to the source of positive potential B+. Resistors 275, 276, 277 are provided in the grid circuit of the cathode follower. The output of the cathode follower is taken off between cathode 278 and ground to be transmitted via terminals 279, 280 to an amplifier such as the amplifier 38 of the recorder amplifier shown in Fig. 2.

Figure 5:
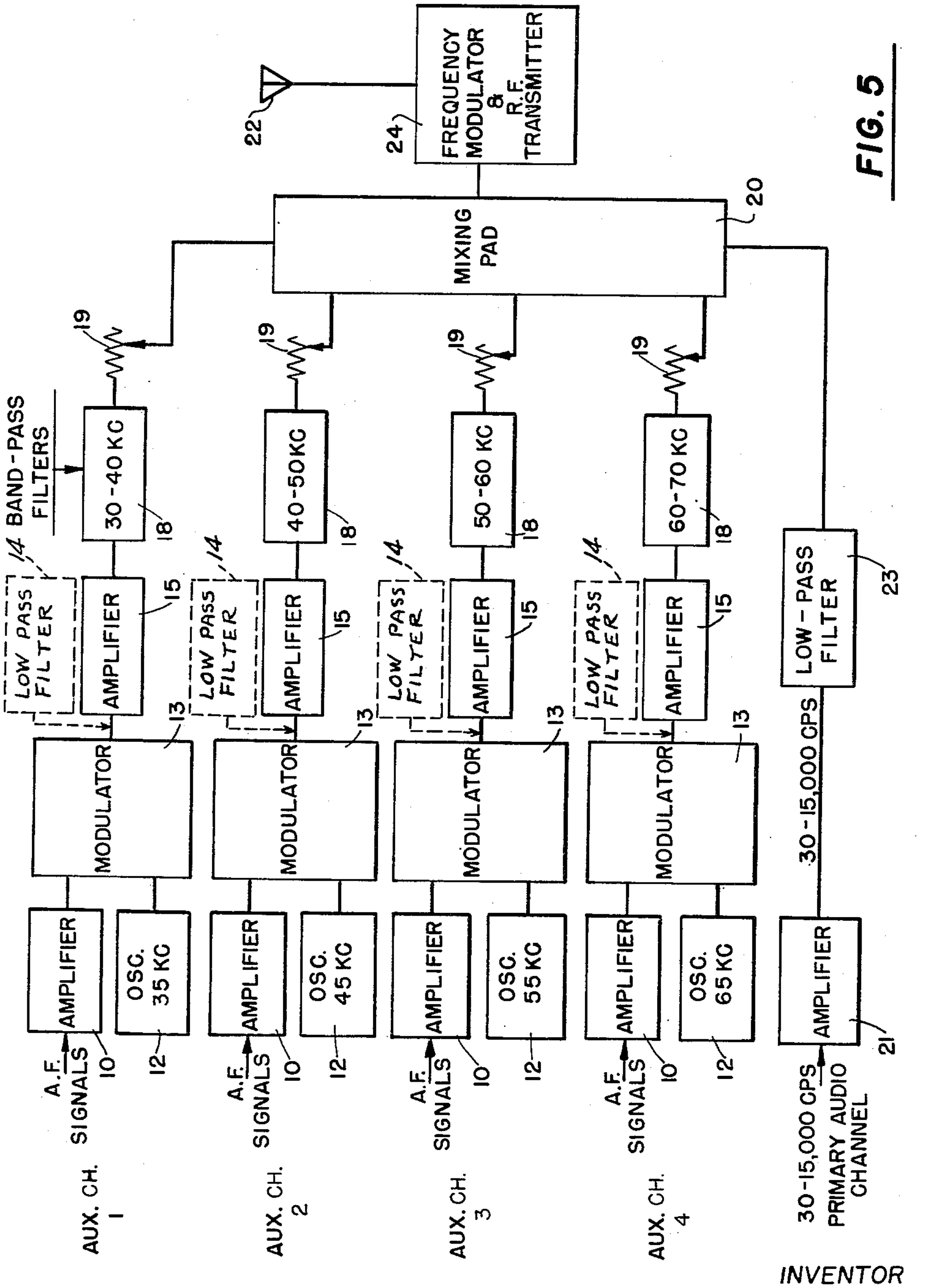
Fig. 5 shows a block diagram of a portion of another multiplex transmission system arranged in accordance with the teaching of the invention.

An important modification of the invention will now be described particularly with reference to a multiplex system including more than two channels as shown in Fig. 5. The system includes a primary audio channel and four auxiliary signal channels. The primary audio channel transmits the usual broadcast audio frequency signals covering the full range of 30–15,000 cycles per second. The primary audio channel is identical with that of Figs. 1 and 3. The amplifier 21 provides an output of predetermined maximum amplitude to cause a predetermined deviation of the R. F. carrier in the frequency modulation of the radio frequency transmitter. The several auxiliary channels have an arrangement corresponding to that shown in Figs. 1 and 3. Oscillators 12 generate subcarriers of different superaudible frequencies which are modulated in the respective balanced modulators 13 by the amplified signal outputs of amplifiers 10. The modulated subcarrier is amplified in an amplifier 15 and then passed to a bandpass filter 18. A linear transmission network follows each bandpass filter and consists of attenuators 19 and mixing pad 20. From attenuators 19 the outputs of all channels are combined in the linear mixing pad and then fed to the frequency modulator 24 of the R. F. transmitter to modulate the radio frequency carrier generated therein. Each of the attenuators 19 is set to provide a modulated superaudible frequency signal of predetermined maximum amplitude so that a predetermined deviation of the R. F. carrier is produced by the signal output of each auxiliary channel. The frequency modulated R. F. carrier is then radiated by the antenna 22 to suitable receiving systems to be described.

Figure 7:
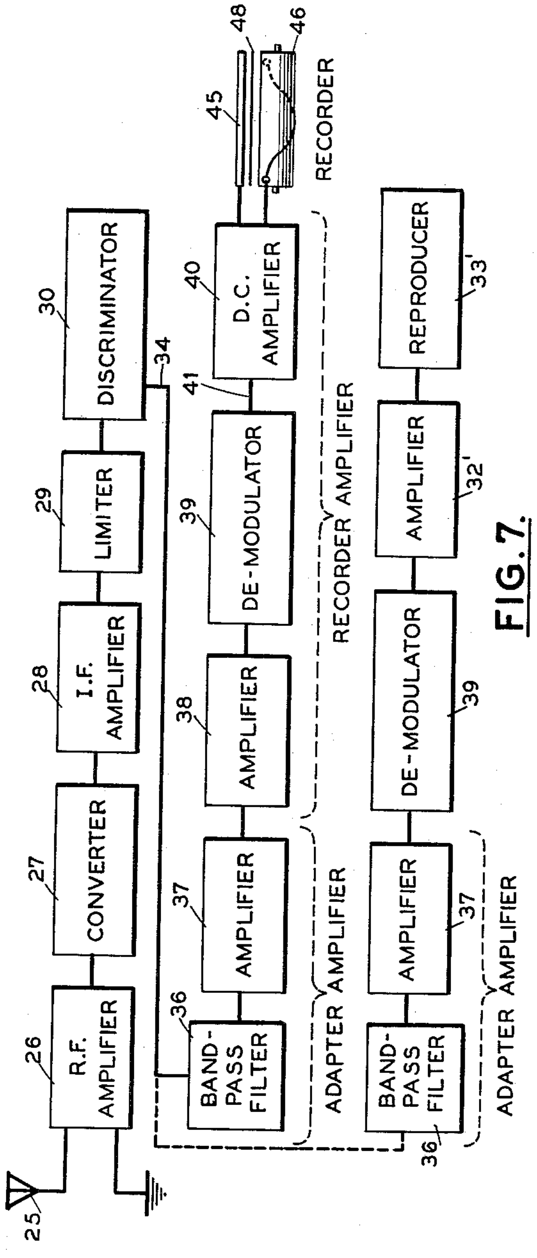
Fig. 7 shows a receiving system usable with the system of Fig. 5.

The receiving systems provided for the several signals multiplexed by the system of Fig. 5 will of course depend on the type of signals carried, whether aural, voice audio, facsimile, telegraph, Teletype or otherwise. In general a standard frequency modulation receiver will suffice for the primary audio program channel as shown by members 25 through 33 of Fig. 2. A typical receiving station for plural auxiliary channels is shown in Fig. 7. The members 25 through 30 are common to all receiving channels. Members 36 through 46 in one channel are arranged to reproduce graphic copy from facsimile signals as also shown in Fig. 2. Members 36, 37, 39, 32′, 33′ in the other channel are arranged to reproduce auxiliary signals of another type such as aural, voice audio, Teletype, telegraph, etc. As many receiving channels as required similar to those shown in Fig. 7 may be provided to receive signals from all channels multiplexed by the apparatus of Fig. 5. The bandpass filters 36 at the input of each receiving channel select the particular band of modulated superaudible frequency signals to be demodulated in that channel.

The multiplex system of Fig. 5 requires that careful consideration be given to the respective deviations of the R. F. carrier to be produced by the primary and several auxiliary channels. The maximum possible deviation is required for the primary audio frequency channel to insure a maximum signal-to-noise ratio therein. The auxiliary channels may not be assigned too small an R. F. deviation however, or the signal-to-noise ratio in these channels will be so high that satisfactory reception can only be obtained in a service area which is relatively small compared with the normal services area of the primary audio channel. In general the higher the deviation assigned to each multiplexed channel, the higher will be the signal-to-noise ratio at any particular receiving location for the several channels. In the duplex system disclosed heretofore, deviations of the R. F. carrier up to ten kilocycles produced by the auxiliary channel were discovered to provide optimum interference ratios for the primary channel. It was further found that a deviation $\Delta F'$ as small as five kilocycles extended the service area of the single auxiliary channel to an area approximating the normal service area of the primary channel.

In order to provide a multiplex system as shown in Fig. 5 including four auxiliary channels in addition to the primary channel for a standard system employing a total R. F. deviation $\Delta F$ of 75 kc. a deviation $\Delta F'$ of five kilocycles may be provided for each auxiliary channel. In such an arrangement a total of 20 kilocycles may be assigned to four auxiliary channels, leaving 55 kilocycles for the deviation produced by the primary audio program channel. In such an arrangement a slight reduction in the signal-to-noise ratio of the primary audio program is caused but the original signal-to-noise ratio (of the transmitter operating simplex) may be recovered by a relatively small increase in the effective radiated power of the transmitter. If the area of coverage of the four multiplexed auxiliary channels may be somewhat limited, that is, if the area may be materially less than the normal service area of the transmitter for the primary audio program, a deviation $\Delta F'$ of considerably less than five kilocycles per auxiliary channel may be assigned and satisfactory multiplex communication according to the invention will be obtained. Thus if 2.5 kilocycles of deviation are assigned to each of four auxiliary channels, the total $\Delta F'$ deviation produced by all the auxiliary channels will be ten kilocycles. This deviation will produce an interference ratio as shown in Fig. 6 of more than 60 db in receivers having a maximum of 5% of modulation distortion. The final determination of the deviation to be assigned to each channel of a multiplex system according to the invention will thus depend on factors such as the number of channels in the system, prescribed minimum signal-to-noise ratio for each channel, tolerable inter-channel interference, service area required for each channel, distortion in the receivers of the several channels, etc.

In the system of Fig. 5 of each of the auxiliary channels transmits audio frequency signals which may be in the range of 0–5 kc. Oscillators 12 may generate 35, 45, 55, and 65 kc. subcarriers respectively. The outputs of modulators 13 are double sideband amplitude modulated signals with suppressed carriers. The modulated subcarriers occupy the frequency bands of 30–40, 40–50, 50–60 and 60–70 kc. respectively. These modulated subcarriers are amplified in the amplifiers 15 and then fed to the bandpass filters 18 which pass only the respective frequency bands indicated to the linear transmission network. The arrangement of Fig. 5 has been described for double sideband wave transmission in each channel. The same arrangement can be used for vestigial or single sideband wave transmission which will permit a broader band of audio frequency signals to be transmitted in each auxiliary channel. Thus if the auxiliary audio frequency signals cover a range of 0–10 kc. and the oscillators 12 generate 39, 49, 59, and 69 kc. subcarriers respectively. The double sideband outputs of the modulators 13 will be 30–49, 40–59, 50–69 and 60–79 kc. respectively. The bandpass filters will pass only the lower sidebands 30–39, 40–49, 50–59 and 60–69 kc. respectively if the filters 18 are designed to cut off the signals between 39 and 40, 49 and 50, 59 and 60, 69 and 70 kc. respectively.

The system of Fig. 5 is also adapted for frequency modulation of the superaudible frequency subcarriers. Thus the audio frequency signals may frequency modulate the superaudible frequency carriers and then the modulated subcarriers pass through amplifiers 15 and band pass filters 18 to the linear transmission network. The maximum amplitudes of the modulated subcarriers will be set at predetermined values with respect to the maximum amplitude of the primary audio channel output to fix the maximum deviations of the R. F. carrier produced by each channel output as such relative amounts that cross interference between the received signals is minimized. For frequency modulation of the superaudible frequency subcarriers in Figs. 1 or 5 by audio frequency signals up to 5 kc. a deviation of each subcarrier of 5 kc. will be produced, for a deviation ratio of unity. If a deviation ratio greater than unity is desired such as 2, for example, then the 5 kc. deviation may be retained but the maximum frequency of the audio frequency signals will be 2.5 kc. The deviation ratio mentioned is, of course, the ratio of carrier deviation to maximum modulating frequency.

It will be noted that the low pass filters 14 employed in the systems of Figs. 1 and 3 may be omitted from Fig. 5. These filters are shown in dotted lines to indicate that they may be used if desired to insure that the signals fed to amplifiers 15 are absolutely free of frequency components higher than the maximum frequency to be transmitted by the band pass filters 18. In no event may filters 18 be omitted. Each of attenuators 19 in Fig. 5 is set to provide a predetermined maximum amplitude for each channel output so that the interference ratio of interfering signals reproduced in receivers arranged as shown in Figs. 2 and 7 is at least 60 db. In this way no perceptible interference between the several multiplexed signals is detectable in the outputs of the receivers of all channels.

In the description of the invention certain of the superaudible frequency subcarriers in the auxiliary channels have been described as being modulated by audio frequency subcarriers which are themselves modulated by the several auxiliary audio frequency signaling currents. It is of course quite possible as illustarted in Fig. 5 to omit the audio frequency subcarriers for certain types of signals and directly modulate the superaudible frequency subcarriers by unmodulated audio frequency signaling currents. It is also considered as coming within the scope of the present invention to frequency modulate, phase modulate, or modulate in other known ways, the several superaudible frequency subcarriers rather than amplitude modulate them and to provide appropriate demodulators in the auxiliary receiving channels to demodulate the modulated subcarriers to reproduce the original auxiliary signaling currents.

While the invention has been described in considerable detail and by reference to specific frequencies, it will be understood that this has been done by way of illustration and not as a limitation on the scope of the invention which is to be construed by reference to the appended claims.

This application is a continuation-in-part of my copending application Ser. No. 84,622, filed March 31, 1949.

What is claimed is:

1. A multiplex system for frequency modulating a radio frequency carrier, comprising a primary channel including in circuit in succession a first source of audio frequency signals, an amplifier for said signal, and a terminating filter for passing only amplified audio frequency signals; a plurality of auxiliary channels, each including a source of other audio frequency signals and a source of signals of predetermined superaudible frequency connected to a modulator to produce amplitude modulated double sideband superaudible frequency signals, said modulator being connected to a filter for passing only one of the sidebands, an amplifier for the passed sideband, and a final filter for passing only the amplified sideband, the superaudible signals in each auxiliary channel occupying a different predetermined frequency range so that the several sidebands passing the said final filters cover bands of different superaudible frequency range, each of said final filters being connected to attenuating means for fixing the maximum amplitudes of the signals passing the terminating and final filters at predetermined relative values, and a transmission means including a mixing pad connected directly to said attenuating means and terminating filter and providing a common linear path for the filtered audio frequency signals and the filtered bands of superaudible frequency signals directly from the several channels to input terminals of a frequency modulator for said carrier.

2. A multiplex system including means for frequency modulating a radio frequency carrier, comprising at least two channels; one of said channels including in circuit in succession a source of first audio frequency signals, an amplifier, and a first filter for said signals; the other of said channels including in circuit in succession a source of double sideband superaudible frequency signals amplitude modulated by other audio frequency signals, another filter for passing the lower one of said sidebands, an amplifier and a bandpass filter for said lower sideband; and a linear transmission network providing a common path for filtered bands of audio frequency and superaudible frequency signals directly from said first filter and bandpass filter respectively to terminals of a frequency modulator for said radio frequency carrier; said channels including attenuating means for fixing the maximum amplitudes of said filtered audio frequency and superaudible frequency signals at predetermined relative values to minimize interference in an associated receiving system.

3. A multiplex system according to claim 2, wherein said source of superaudible frequency signals comprises a source of said other audio frequency signals and a generator of a superaudible frequency subcarrier, connected to a balanced modulator.

4. A multiplex system according to claim 2, further comprising means for receiving and demodulating said frequency modulated carrier to reproduce said filtered band of superaudible frequency signals, a band-pass filter connected to said means to pass only the reproduced band of superaudible frequency signals, and a demodulator connected to the last named filter to reproduce said other audio frequency signals.

5. A multiplex system according to claim 4, wherein said source of other audio frequency signals comprises a generator of an audio frequency subcarrier and a source of auxiliary audio frequency signals, connected to an amplitude modulator.

6. A multiplex system according to claim 5, wherein said source of auxiliary audio frequency signals is a facsimile scanner.

7. A multiplex system according to claim 6, further comprising means for receiving and demodulating said frequency modulated carrier to reproduce said filtered band of superaudible frequency signals, a bandpass filter connected to said means to pass only the reproduced band of superaudible frequency signals, a demodulator connected to the last named filter to reproduce audio frequency facsimile signals, and means to translate said facsimile signals into graphic copy.

8. A multiplex system according to claim 2, wherein said receiving system comprises means for receiving and demodulating said frequency modulated radio frequency carrier, and means for translating the domodulated carrier into sound of audible amplitudes, said sound having interfering components at least 60 decibels lower in amplitude than the lowest amplitude of said sound.

9. A multiplex system including means for frequency modulating a radio frequency carrier, comprising a plurality of channels; one of said channels including in circuit in succession a source of first audio frequency signals, an amplifier and a first filter for said signals; a plurality of other of said channels each including in circuit in succession a source of double-sideband superaudible frequency signals amplitude modulated by other audio frequency signals, another filter for passing the lower one of said sidebands, an amplifier and a bandpass filter for passing only said lower sideband, each of the several lower side bands covering a different band of superaudible frequencies; and a linear transmission network providing a common path for a filtered band of audio frequency signals and filtered bands of superaudible frequency signals directly from the first filter and bandpass filters respectively to terminals of a frequency modulator for said carrier; said channels including attenuating means for fixing the maximum amplitudes of said filtered audio frequency and superaudible frequency signals at predetermined relative values to minimize interference in an associated receiving system.

10. A multiplex system according to claim 9, further comprising means for receiving and demodulating said frequency modulated carrier to reproduce said filtered bands of superaudible frequency signals, a plurality of bandpass filters connected to said means to pass only predetermined ones of said bands of superaudible frequency signals, and a demodulator connected to each of the last named filters to reproduce said other audio frequency signals.

References Cited in the file of this patent

UNITED STATES PATENTS

| | | |
|---|---|---|
| 2,233,183 | Roder | Feb. 25, 1941 |
| 2,258,871 | Wedig | Oct. 14, 1941 |
| 2,578,714 | Martin | Dec. 18, 1951 |

OTHER REFERENCES

Terman's Radio Engineering, 3rd edition, page 482.